G. W. Livermore,
Crozing Staves.
No. 10,749.    Patented Apr. 4, 1854.
Fig. 1.
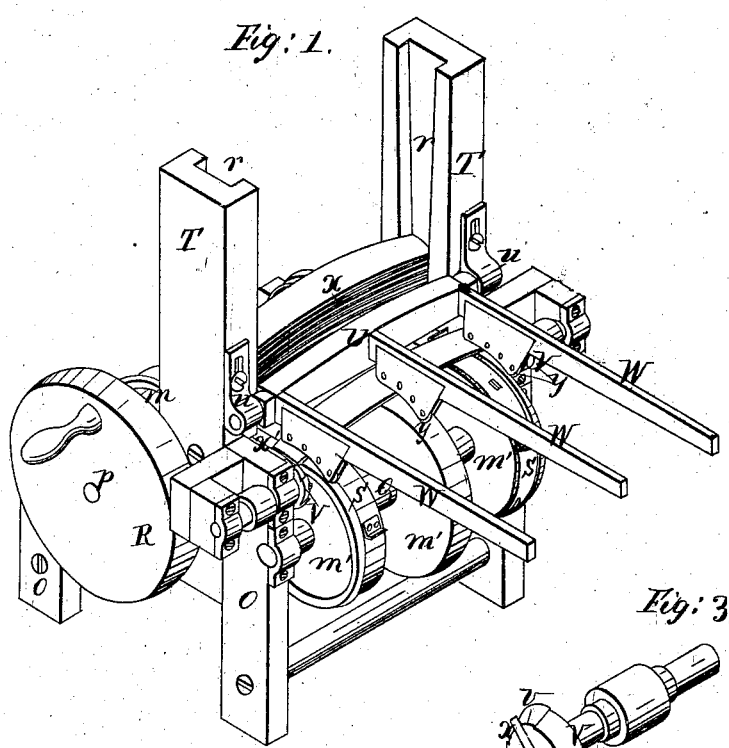
Fig. 3.
Fig. 2.
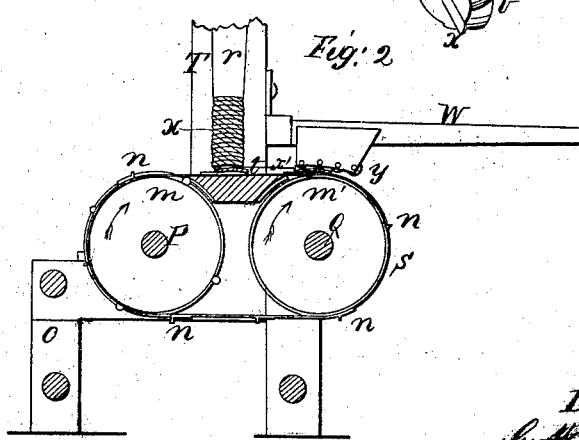
Witnesses:    Inventor:

UNITED STATES PATENT OFFICE.

GEORGE W. LIVERMORE, OF CAMBRIDGEPORT, MASSACHUSETTS.

MACHINE FOR CROZING THE ENDS OF STAVES.

Specification of Letters Patent No. 10,749, dated April 4, 1854.

*To all whom it may concern:*

Be it known that I, GEO. W. LIVERMORE, of Cambridgeport, in the county of Middlesex and State of Massachusetts, have invented certain new and useful Improvements in Machinery for Crozing the Ends of Staves, of which the following is a full, clear, and exact description, reference being had to the annexed drawings, making part of this specification, in which—

Figure 1, is an isometric view of the machine. Fig. 2, a section through the same. Fig. 3, a view of one of the chamfering and crozing cutters detached.

To enable others skilled in the art to make and use my invention I will proceed to describe the manner in which I have carried it out.

O is the frame work of this machine; P, the driving shaft; Q, another shaft similar and parallel thereto. These shafts carry each three drums or short cylinders $m$, $m'$, the exterior pairs of which drums carry the endless bands S, to which the feeding dogs $n$, are attached.

R is the driving pulley upon the shaft P.

T are uprights which are grooved as seen at $r$, for the purpose of forming a hopper for the reception of the staves. At the bottom of the groove $r$, the upright T is cut away as seen at $t$, for the purpose of permitting one stave at a time only to pass out, under the operation of the feeding dogs $n$.

U is a horizontal shaft which vibrates freely in bearings $u$, and into which are mortised the three levers W, to which are secured the friction pressure rollers $y$, the object of which is to hold the stave firmly down upon the carrying drums $m'$, while the operation of crozing is going on, at the same time that it is permitted to pass freely beneath the friction rollers, as it is carried by the band $s$, and dogs $n$.

V are the compound cutters for finishing the end of the stave, the cutter $v$, cutting the chamfer and the cutter $x$, the croze. These compound cutters are caused to revolve upon each side of the machine in such a position (Fig. 1) that as the stave is fed from the hopper it shall come in contact with the cutters at the same time that it is held firmly upon the carrying drums by the pressure levers W.

The operation of this machine is briefly as follows: The staves X are placed in quantities in the groove $r$, of the upright T with their convex sides uppermost; motion is communicated to the shaft P in the direction indicated by the arrows in Fig. 2. As the dogs $n$, pass beneath the hopper the staves are withdrawn one by one and carried beneath the presser bars W, by which they are prevented from rising while passing over the cutters V. The croze and chamfer are thus formed, without interrupting the motion of the stave and the next instant it drops from the machine. In order that the ends of the staves may fall exactly over the cutters as they pass out of the trough of the machine they are made to pass between guides $x'$ upon each side of the machine which insure their passage directly over the cutters as required. It is evident that in place of the bars W, and friction rollers $y$, spring pressure rollers may be substituted to hold the stave down to the cutters.

Instead of the revolving drums and endless chains or belts $s$, arranged as above the belt or chains may be dispensed with, the dogs $n$, being secured directly to the drums which are placed immediately beneath the hopper and to the surface of which the staves are held by the pressure bars until the operation of crozing and chamfering is completed.

What I claim as my invention and desire to secure by Letters Patent is—

The combination of the carrying drums $m'$, the presser bars W, and the revolving cutters V, with the hopper $r$, for the purpose of delivering the staves one by one to the cutters, the hopper being constructed as represented at $t$, Fig. 2, to permit the escape of the stave on one side and not on the other.

GEO. W. LIVERMORE.

Witnesses:
JOHN S. CLOW,
SAM. COOPER.